United States Patent
Haerterich et al.

(10) Patent No.: US 10,061,925 B2
(45) Date of Patent: Aug. 28, 2018

(54) DETECTING ATTACKS BY MATCHING OF ACCESS FREQUENCIES AND SEQUENCES IN DIFFERENT SOFTWARE LAYERS

(71) Applicant: SAP SE, Walldorf (DE)

(72) Inventors: Martin Haerterich, Wiesloch (DE); Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 15/187,703

(22) Filed: Jun. 20, 2016

(65) Prior Publication Data

US 2017/0364680 A1   Dec. 21, 2017

(51) Int. Cl.
  *G06F 21/56*  (2013.01)
  *G06F 21/52*  (2013.01)
  *G06F 21/55*  (2013.01)

(52) U.S. Cl.
  CPC ............ *G06F 21/566* (2013.01); *G06F 21/52* (2013.01); *G06F 21/554* (2013.01); *G06F 2221/033* (2013.01)

(58) Field of Classification Search
  CPC ...... G06F 21/566; G06F 21/52; G06F 21/554; G06F 2221/033
  See application file for complete search history.

(56) References Cited

U.S. PATENT DOCUMENTS

| | | | | |
|---|---|---|---|---|
| 7,475,405 B2 * | 1/2009 | Manganaris | .......... | G06F 21/552 706/45 |
| 8,214,365 B1 * | 7/2012 | Manadhata | .......... | G06K 9/6272 707/737 |
| 9,442,905 B1 * | 9/2016 | Kawaguchi | .......... | G06F 17/2247 |
| 2009/0199296 A1 * | 8/2009 | Xie | .......... | G06F 21/316 726/23 |
| 2011/0185422 A1 * | 7/2011 | Khayam | .......... | H04L 63/1425 726/23 |
| 2013/0133066 A1 * | 5/2013 | Natarajan | .......... | H04L 63/1408 726/23 |
| 2014/0143868 A1 * | 5/2014 | Shiva | .......... | G06F 21/552 726/23 |
| 2015/0355957 A1 * | 12/2015 | Steiner | .......... | G06F 11/0772 714/37 |
| 2015/0373043 A1 * | 12/2015 | Wang | .......... | G06F 21/552 706/12 |

(Continued)

OTHER PUBLICATIONS

Gogoi et al.. "MLH-IDS: A Multi-Level Hybrid Intrusion Detection Method", May 12, 2013, The Computer Journal, vol. 57, Issue: 4.*

(Continued)

*Primary Examiner* — Lisa C Lewis
*Assistant Examiner* — Zhimei Zhu
(74) *Attorney, Agent, or Firm* — Jones Day (57) ABSTRACT

A number of events are counted in different layers of a computing environment during execution of a software application. The number of counted events can be compared to a previously generated cluster set to determine that at least one of the counted events is an outlier. Data can then be provided that characterizes the at least one of the counted events determined to be an outlier. In some cases, some or all of the functionality of the software application can be selectively disabled. Related apparatus, systems, techniques and articles are also described.

18 Claims, 5 Drawing Sheets

(56) References Cited

U.S. PATENT DOCUMENTS

| | | | |
|---|---|---|---|
| 2016/0092681 A1* | 3/2016 | Valles | G06F 21/554 |
| | | | 726/23 |
| 2016/0127402 A1* | 5/2016 | Veeramachaneni | |
| | | | H04L 63/1425 |
| | | | 726/23 |
| 2017/0126710 A1* | 5/2017 | De-Levie | H04L 63/1425 |
| 2017/0206354 A1* | 7/2017 | Pieczul | G06F 21/566 |
| 2017/0228460 A1* | 8/2017 | Amel | G06F 17/30864 |
| 2017/0277966 A1* | 9/2017 | Abousleman | G06K 9/3233 |
| 2017/0339192 A1* | 11/2017 | Veeramachaneni | H04L 63/20 |

OTHER PUBLICATIONS

Birnbaum et al., "Intrusion Detection Using N-Grams of Object Access Graph Components," The Eighth International Conference on Digital Society, pp. 209-215 (2014).

Ester et al., "A Density-Based Algorithm for Discovering Clusters," KDD-96 Proceedings, pp. 226-231 (1996).

Halfond et al., "Amnesia: Analysis and Monitoring for NEutralizing SQL-Injection Attacks," ASE '05, Nov. 7-11, 2005 (10 pages).

Le et al., "DoubleGuard: Detecting Intrusions in Multi-tier Web Applications," IEEE Transactions on dependable and secure computing, 9(4):512-525 (2012).

Mahoney et al., "Learning Nonstationary Models of Normal Network Traffic for Detecting Novel Attacks," SIGKDD '02, Jul. 23-26, 2002, pp. 1-10.

Valeur et al., "A Learning-Based Approach to the Detection of SQL Attacks," Reliable Software Group, Department of Computer Science, University of California, Santa Barbara, 2005 (18 pages).

Wressnegger et al., "A Close Look on $^{n}$-Grams in Intrusion Detection: Anomaly Detection vs. Classification," AISec '13, Nov. 4, 2013 (10 pages).

Zhang et al., "BIRCH: An Efficient Data Clustering Method for Very Large Databases," SIGMOD, pp. 103-114 (1996).

* cited by examiner

DETECTING ATTACKS BY MATCHING OF ACCESS FREQUENCIES AND SEQUENCES IN DIFFERENT SOFTWARE LAYERS

TECHNICAL FIELD

The subject matter described herein relates to the detection of intrusions/attacks by monitoring and matching access frequencies and access sequences in different software layers.

BACKGROUND

As modern business systems become increasingly connected, they become a valuable target for attackers trying to infiltrate and manipulate core processes of companies. At the same time, attackers are becoming more sophisticated in the manner in which traditional security measures are circumvented. Moreover, both social engineering and insider attacks may lead to a situation where valid system users may not be trusted. Application level intrusion detection systems hence become more and more important as an additional line of defense which alert administrators to unusual behavior in their systems.

SUMMARY

In a first aspect, a number of events are counted in different layers of a computing environment during execution of a software application. The number of counted events can be compared to a previously generated cluster set to determine that at least one of the counted events is an outlier. Data can then be provided that characterizes the at least one of the counted events determined to be an outlier. In some cases, some or all of the functionality of the software application can be selectively disabled.

The providing data can include at least one of displaying at least a portion of the data in an electronic visual display, transmitting at least a portion of the data to a remote computing system, loading at least a portion of the data into memory, or storing at least a portion of the data into persistent memory. In addition or in the alternative, the providing data can include generating an alert characterizing the at least one of the counted events determined to be an outlier.

The previously generated cluster set can be generated using various clustering algorithms. In one example, a density-based clustering algorithm can define clusters based on higher density of events as compared to other events. The density-based clustering algorithm can be a density-based spatial clustering of applications with noise (DBSCAN) algorithm. The density-based clustering algorithm can alternatively be an ordering points to identify the clustering structure (OPTICS) algorithm.

The clustering algorithm can be an unsupervised data mining algorithm. An example unsupervised data mining algorithm is a balanced iterative reducing and clustering using hierarchies (BIRCH) algorithm.

In some implementations, the computing environment comprises only a single computing device. In other variations, the computing environment includes at least two interconnected computing devices.

The counting can include counting, for a single event at a first, higher application layer, a number of corresponding events at a second, lower application layer.

In an interrelated aspect, a sequence of events can be monitored, in different layers of a computing environment, during execution of a software application. The number monitored events are compared to a previously generated cluster set to determine that at the sequence of at least some of such events is an outlier. Data characterizing the at least one sequence of events determined to be an outlier can be provided.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a more effective way to identify intrusions/potential intrusions within multi-layer architectures. For example, the current subject matter can detect malware on the operating system level that may lead to direct database accesses which do not relate to any log entries on application level.

The current subject matter also provides technical advantages in that in can detect a scenario in which a user extends the functionality he or she can use which, in turn, can lead to a change of the number of table accesses or even to activities involving new tables which would otherwise go undetected.

Further, the current subject matter can also detect malicious techniques in which user input processing may have flaws that lead to unforeseen program execution and/or cause anomalous database accesses. As an example, the current subject matter can be used to identify an SQL injection in which the rogue input contains a semicolon to terminate the intended statement and some arbitrary malicious SQL code afterwards.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
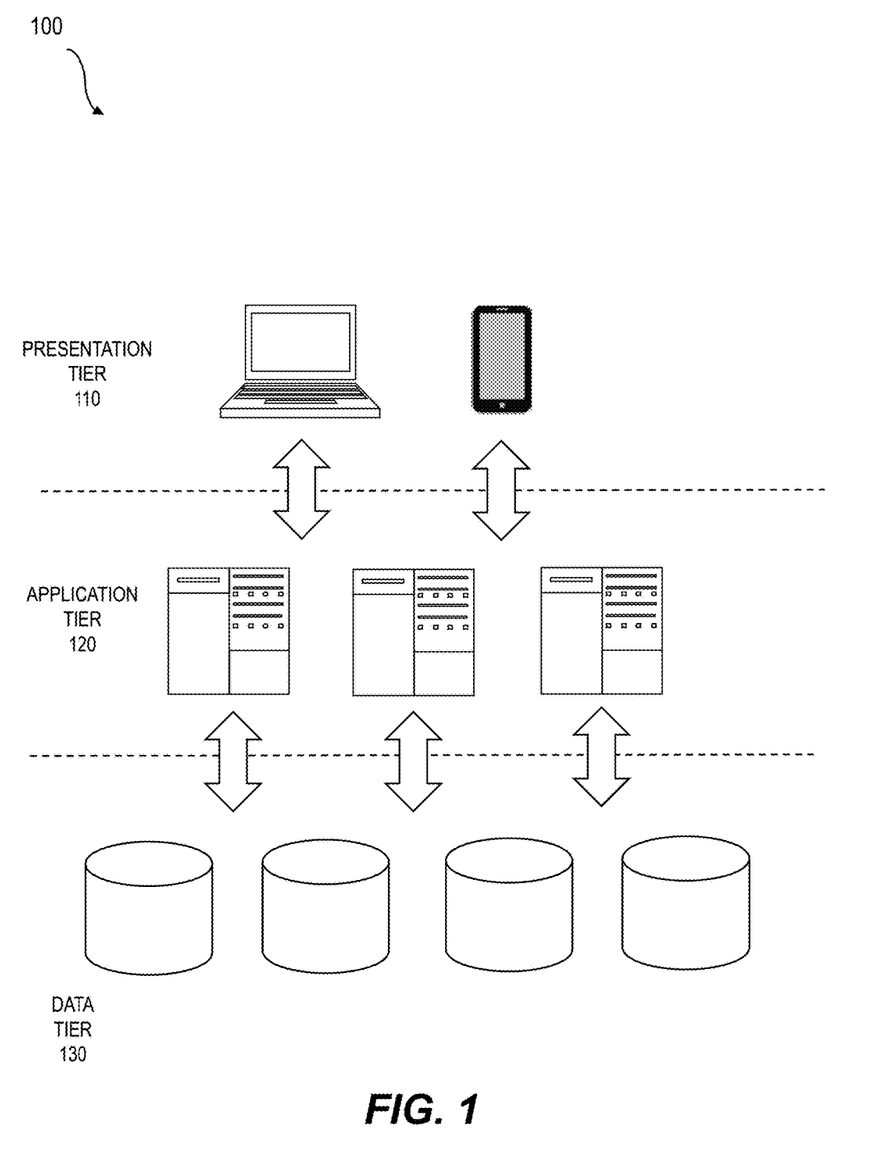
FIG. 1 is a diagram illustrating a multi-tier computing architecture for implementing multiple layers.

The current subject matter is directed to anomaly-based intrusion detection on the application level in a multi-layer computing architecture. FIG. 1 is a diagram 100 illustrating an example multi-tier architecture including a presentation tier 110, an application tier 120, and a data tier 130 that can be executed across multiple computing devices (e.g., a client-server architecture, etc.). Each of these tiers 110, 120, 130 can, in some cases, be implemented by separate and distinct computing devices/data storage devices/database (e.g., client devices in the presentation tier 110, servers in the application tier 120, and databases in the data tier 130, etc.) and, in other cases, be implemented by a single computing device. The current subject matter is directed to identifying abnormal activity in layers which, in turn, can be used to determine, whether any events are likely to be malicious in nature (e.g., malware, etc.).

The presentation tier 110 can execute a topmost layer in the multi-tier architecture which can be referred to, for example, as a presentation layer, which in turn, can, for example, execute user interface functionality (e.g., data presentation, interaction with graphical user interfaces, etc.). The presentation tier 110 can directly communicate with the application tier 120 and indirectly communicate with the data tier 130 via the application tier 120 and translate tasks from both tiers 120, 130 for user interaction.

The application tier 120 can include an application layer that includes logic to initiate queries to the data tier 130, to process results from the data tier 130 for ultimate presentation at the presentation tier 110, and to handle other data coordination and manipulation activities.

The data tier 130 can include data persistence mechanisms (database servers, file shares, etc.) and a data access layer that encapsulates the persistence mechanisms and exposes the data. The data access layer can provide an interface to the application tier 129 that exposes methods of managing the stored data without exposing or creating dependencies on the data storage mechanisms. Avoiding dependencies on the storage mechanisms allows for updates or changes without the application tier 120 clients being affected by or even aware of the change.

It will be appreciated that, unless otherwise specified, the current subject matter is applicable to arrangements with different layers and/or that work with different computing architectures (including a single client device). For example, each of the tiers 110, 120, 130 can include multiple layers including, for example, various abstraction levels being executed at the presentation tier 110, various database/data access layers forming part of either of the application layer 120 or the data layer 130 and the like.

As noted above, application software is built upon lower layers of technical components which themselves are built on top of the database layer. With most multi-layer architectures (such as that illustrated in FIG. 1), the control flow is typically organized in a way that there is no upcall to a higher layer. Therefore, the system's behavior on a lower level, in particular, the number and the order of events occurring at such lower level is determined by the higher level.

As an example, FIG. 1 can correspond to an Enterprise Resource Planning (ERP) system that includes a presentation layer in which user interface (UI) view are rendered for a user (at the presentation tier 110), an application layer comprising various application logic for executing various application transactions (at the application tier 120), and a data access layer (for interfacing with a database or other servers, etc.) (at the data tier 130). Using such a three tiered setup, the sequence of tables accesses occurring in SQL queries in the data access layer (at the data tier 130) can be monitored and correlated (when possible) with application transactions in the application layer (at the application tier 120).

The current subject matter can be used to detect attacks including, for example:

1. Malware (i.e., malicious software) on the operating system (OS) level that can lead to direct database accesses which do not relate to any log entries on application level.

2. By elevating his privileges a user can in the same application context extend the functionality it can use. This extension can lead to a change of the number of table accesses or even to activities involving new tables.

3. User input processing may have flaws that lead to unforeseen program execution and/or cause anomalous database accesses. As an example, consider an SQL injection where the rogue input contains a semicolon to terminate the intended statement and some arbitrary malicious SQL code afterwards.

A clustering algorithm, for example, a density-based spatial clustering of applications with noise (DBSCAN) can cluster points in a feature space by their distance to each other and the number of points that are close enough to each other. DBSCAN identifies dense areas of examples and can be used to mark as outliers all samples that cannot be added to a cluster. Besides the input data points the algorithm depends on two parameters:

ε the maximum distance between two points making them neighbors minPts the minimum number of neighbors to make up a cluster.

A point is considered a core point, if the number of neighbors is greater or equal to the number of points required to form a cluster. If a point is not within the distance of ε to a core point, then it does not belong to the cluster. Furthermore, if a point does not belong to any cluster, it is considered an outlier.

The DBSCAN algorithm can iterate through all points of a given data set and determine for each one, what the distance to each other is. If the distance between two points is smaller or equal to the parameter ε then they are considered neighbors. When the number of neighbors from a point is greater than or equal to the minPts parameter, then it starts a new cluster, otherwise the point is an outlier. The algorithm can be applied to a training data set and an initial clustering is obtained.

Other types of clustering algorithms can be utilized including an ordering points to identify the clustering structure (OPTICS) algorithm. In addition, other types of clustering algorithms can be utilized. For example, unsupervised data mining algorithms such as a balanced iterative reducing and clustering using hierarchies (BIRCH) algorithm can be used.

As repeated execution of a given code fragment in the application triggers very similar database operations, a connection can be made between these two layers (e.g., application layer and database layer). This connection, in turn, allows for the identification of whether a specific database operation is likely to be malicious. In some variations, it can be assumed that database operations that cannot be linked to a higher level code fragment are inherently suspicious as they apparently have been triggered through an anomalous execution flow.

An algorithm is provided herein that can include both a training phase and an application phase. Let $Ev_H$ be the events in a higher layer and $Ev_L$ be events occurring in a lower layer.

Training Phase:
1. For each event $h \in Ev_H$ count the number of occurrences $c_h(l)$ of events $l \in Ev_L$ correlated (by time stamp) with h at each of a plurality of application layers.
2. Apply the DBSCAN algorithm (or other clustering algorithm) to the set of points (h, $c_h(l)$).
3. As a result obtain a clustering of this feature set.

Application Phase:
1. For a single event h in the higher layer, count the number of occurrences $c_h(l)$ for all relevant events l in the lower layer.
2. Apply the DBSCAN algorithm to the set of points (h, $c_h(l)$).
3. If any of the points (h, $c_h(l)$) is flagged as an outlier raise an alert and store the corresponding events (h, l) in an alert set A for further inspection.

In one example, $Ev_H$ are the events "Transaction XYZ started by user U". $Ev_L$ are the events "User U executes an SQL query on the database table T" for the same user U. Hence, the number of accesses to an individual tables during single executions of a given transaction executed by a software application are counted. Outliers in the set of frequencies in which these numbers occur can then be identified.

In some variations, the order of different events in the lower software layer this can be taken into account by counting n grams of events from $Ev_L$. $c_h(l)$ by $c_h(l_1, \ldots, l_n)$ in the above algorithm can be replaced where $l_1, \ldots, l_n \in Ev_L$ is any sequence of immediately subsequent events all of which are correlated with h. The same event may occur more than once in overlapping sequences and abnormal sequences can be identified which, in turn, can correlate to anomalous behavior. Stated differently, the sequence of events occurring at different layers in the architecture can be examined for outliers and a clustering algorithm can be used to determine whether such sequence of events is an outlier.

Figure 2:
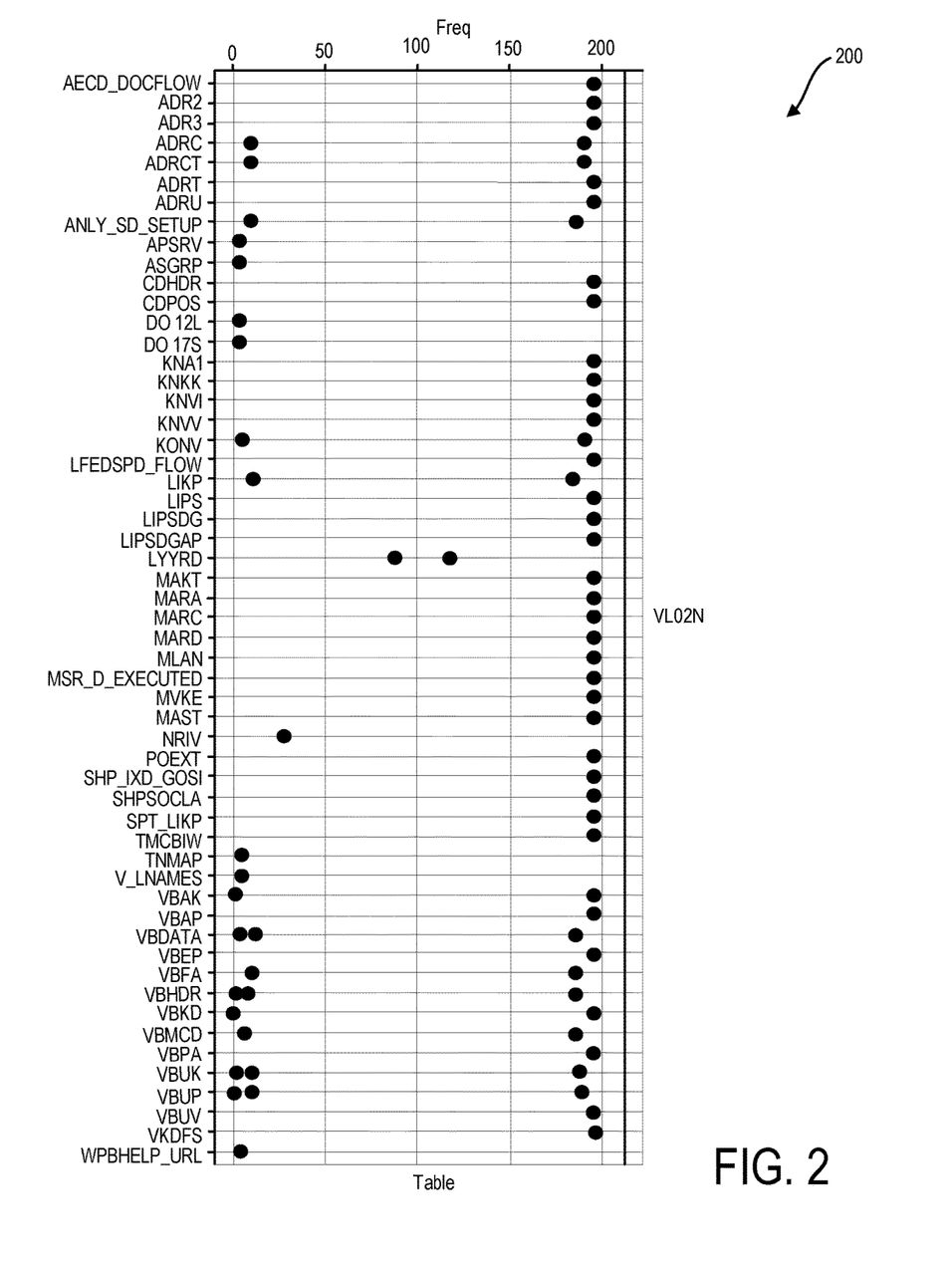
FIG. 2 is a diagram illustrating frequency of table accesses related to transactions.

FIG. 2 is a diagram 200 illustrating frequency of table accesses related to transactions in an experimental setting. Diagram 200, in particular, shows plotting the result of the same number of table accesses by a transaction shows, how similar the executions have been in terms of operations on the database. To be able to relate the number of same operations, a base line can be added, which is the total number of executions of the transaction itself. As is illustrated, most of the accesses were close to the total number of runs. Therefore, those operations can be viewed as usual behavior. Everything close to zero is likely to be noise created by system programs. When looking closely, there are a few table operations that occurred within their frequency only a small number of times, while there is also a value for it close to the base line (e.g. table VBAK). It turns out, that when adding up the frequencies that match those cases, a line similar to the base line results. To divide the normal from anomalous dots using a computer instead of human sense, the DBSCAN algorithm or other clustering algorithm can be used. The parameters for the DBSCAN algorithm can be selected to reflect that the normal behavior is the majority as well as the gap between normal and anomalous data.

As the amount of executions of a transaction increases—causing the base line to increase—the distance has to be handled accordingly. Therefore the parameter ε has to be chosen to be a percentage of the base line. It was determined that choosing 10% of the base line fore to be a reasonable value for our purposes because the cluster has to be dense and only contains examples that are close to each other based on the value of the base line. An ε value below 10% could cause the examples to be too far from each other to reach the minPts parameter. On the other hand, if the value was chosen greater than 10%, then the cluster might start to include examples that should be anomalies. Furthermore, to ensure that the cluster representing the normal behavior contains the majority of examples the minPts parameter was chosen as half the number of total examples.

Figure 3:
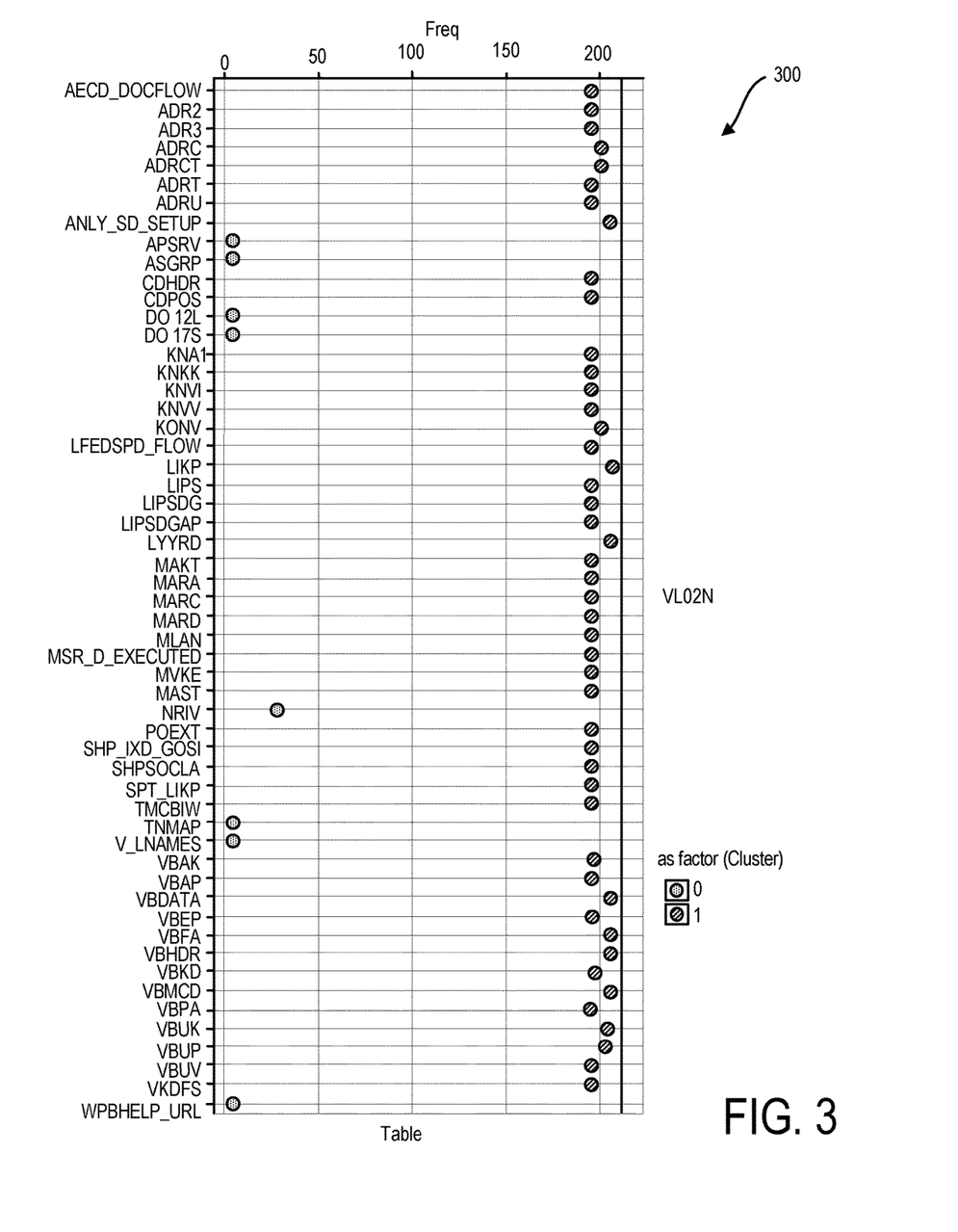
FIG. 3 is a diagram illustrating clustering table usage for one transaction.

Recreating the dot-plot with the cluster calculated using the described parameters results diagram 300 of FIG. 3 which illustrates clustering table usage for one transaction. Examples marked as part of the cluster 0 are noise. To illustrate, a particular example of false positives, the table NRIV, can be examined.

This table of FIG. 3 contains the number ranges used within the system in a lot of different places. The anomaly in the dot-plot is the result of the number range cache which is used to speed up the use of number ranges and to avoid deadlocks on the database level. A configurable amount of number range values (used for consistent document numbering) are reserved and the database is accessed only when the cache does not contain the requested amount of values. Considering this finding, the anomaly can be ignored in future analysis.

The anomalies would create alerts, and are therefore ignored from now on by future analysis—turning the method from pure anomaly detection into a semisupervised anomaly detection method. This manual analysis was carried out for 8 tables and then repeated the experiment. In this experiment, there were 21188 known negative examples, however there are 120 detected anomalies. Therefore there is a false-positive or false alarm rate of 0.57%. An injection attack targeting an otherwise inaccessible table would always show up for the first time for the particular transaction. These attacks would always be detected. Note that injection attacks targeting only a WHERE-clause would be left undetected.

Figure 4:
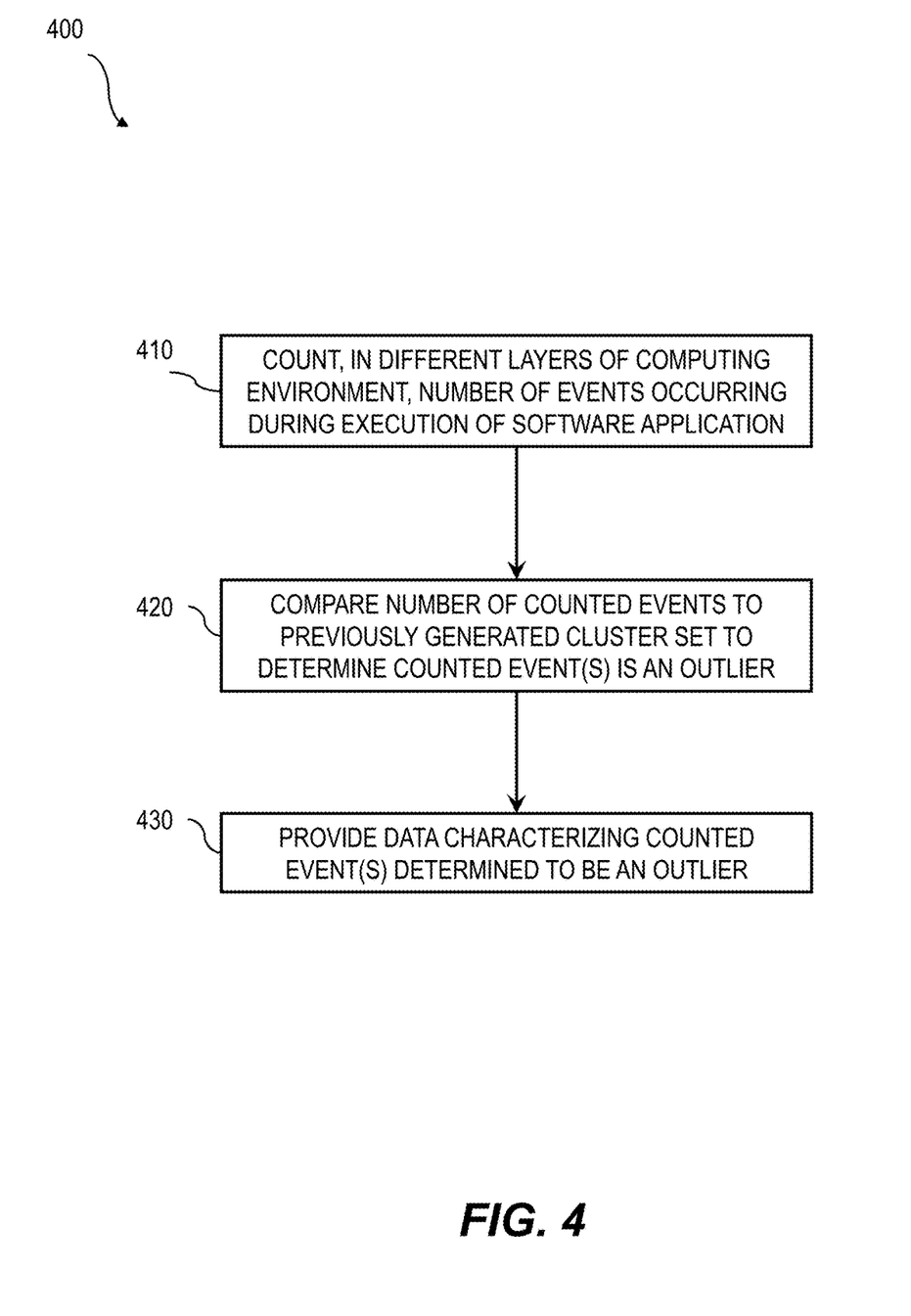
FIG. 4 is a process flow diagram illustrating detection of intrusions by identifying numbers of events at various layers of a multi-layer computing architecture.

FIG. 4 is a diagram 400 in which, at 410, a number of events occurring in different layers of a computing environment are counted during execution of a software application. Thereafter, at 420, the number of counted events are compared to a previously generated cluster set to determine that at least one of the counted events is an outlier. Data can then be provided (e.g., displayed, stored into persistence, loaded into memory, transmitted to a remote computing system, etc.), at 430, that characterizes the at least one of the counted events determined to be an outlier.

Figure 5:
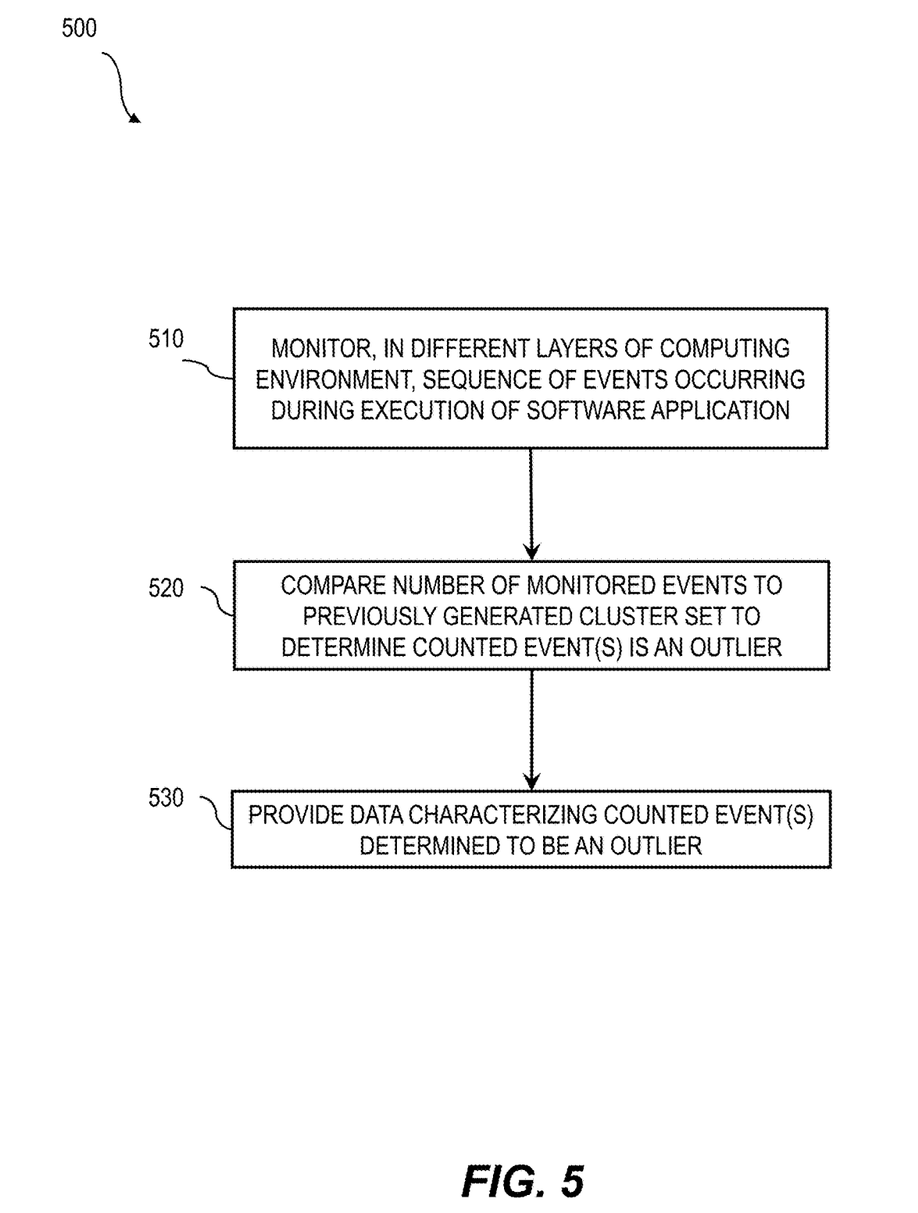
FIG. 5 is a process flow diagram illustrating detection of intrusions by identifying sequences of events at various layers of a multi-layer computing architecture.

FIG. 5 is a diagram 500 in which, at 510, a sequence of events occurring at different layers of a computing environment are monitored during execution of a software application. Thereafter, at 520, the number of monitored events are compared to a previously generated cluster set to determine that at the sequence of at least some of such events is an outlier. Data can then be provided (e.g., displayed, stored into persistence, loaded into memory, transmitted to a remote computing system, etc.), at 520, that characterizes the at least one sequence of events determined to be an outlier.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
   counting, in different layers of a computing environment, a number of events occurring during execution of a software application, the different layers comprising a presentation tier, an application tier, and a database tier;
   correlating the events between the database tier and one or more of the application tier and the presentation tier;
   comparing, using a clustering algorithm trained using historical data characterizing execution of the software application, the number of counted and correlated events to a previously generated cluster set to determine, using the clustering algorithm, that at least one of the events is an outlier; and
   providing data characterizing the at least one of the events determined to be an outlier to enable a determination of whether the execution of the software application is malicious in nature;
   wherein the determination that at least one of the events is an outlier comprises counting n grams of events and inputting the counted n grams to the clustering algorithm.

2. The method of claim 1, wherein the providing data comprises at least one of: displaying at least a portion of the data in an electronic visual display, transmitting at least a portion of the data to a remote computing system, loading at least a portion of the data into memory, or storing at least a portion of the data into persistent memory.

3. The method of claim 1, wherein the providing data comprises: generating an alert characterizing the at least one of the events determined to be an outlier.

4. The method of claim 1, wherein the clustering algorithm is a density-based clustering algorithm.

5. The method of claim 4 wherein the density-based clustering algorithm is a density-based spatial clustering of applications with noise (DBSCAN) algorithm.

6. The method of claim 4 wherein the density-based clustering algorithm is an ordering points to identify the clustering structure (OPTICS) algorithm.

7. The method of claim 1, wherein the clustering algorithm is an unsupervised data mining algorithm.

8. The method of claim 7, wherein the unsupervised data mining algorithm is a balanced iterative reducing and clustering using hierarchies (BIRCH) algorithm.

9. The method of claim 1, wherein the computing environment comprises a single computing device.

10. The method of claim 1, wherein the computing environment comprises at least two interconnected computing devices.

11. The method of claim 1, wherein the counting comprises: counting, for a single event at a first, higher application layer, a number of corresponding events at a second, lower application layer.

12. The method of claim 1, further comprising: ceasing execution of at least a portion of the software application.

13. A system comprising:
at least one data processor; and
memory storing instructions which, when executed by the at least one data processor, result in operations comprising:
counting, in different layers of a computing environment, a number of events occurring during execution of a software application, the different layers comprising a presentation tier, an application tier, and a database tier, the counting comprising: counting and correlating, for each of a plurality of single events at a first, higher application layer, a number of corresponding events at a second, lower application layer;
comparing using a clustering algorithm trained using historical data characterizing execution of the software application, the number of counted events to a previously generated cluster set to determine, using the clustering algorithm, that at least one of the counted events is an outlier; and
providing data characterizing the at least one of the counted events determined to be an outlier to enable a determination of at least one of: malicious software executing, a user extending his or her access privileges, or unforeseen execution by the software application in response to user-input;
wherein the determination that at least one of the counted events is an outlier comprises counting n grams of events and inputting the counted n grams to the clustering algorithm.

14. The system of claim 13 further comprising: generating the previously generated cluster set using a clustering algorithm selected from a group consisting of: a density-based spatial clustering of applications with noise (DBSCAN) algorithm, an ordering points to identify the clustering structure (OPTICS) algorithm, and a balanced iterative reducing and clustering using hierarchies (BIRCH) algorithm.

15. The system of claim 13, wherein the computing environment comprises a single computing device.

16. The system of claim 13, wherein the computing environment comprises at least two interconnected computing devices.

17. The system of claim 13, wherein the operations further comprise: ceasing execution of at least a portion of the software application.

18. A method for implementation by one or more data processors forming part of at least one computing device, the method comprising:
monitoring, in different layers of a computing environment, a number of events occurring during execution of a software application, the different layers comprising a presentation tier, an application tier, and a database tier;
correlating the events between the database tier and one or more of the application tier and the presentation tier;
comparing and correlating the number of monitored events to a previously generated cluster set to determine that at least one of the events across multiple layers is an outlier; and
providing data characterizing the at least one of the events determined to be an outlier to enable a determination of at least one of: malicious software executing, a user extending his or her access privileges, or unforeseen execution by the software application in response to user-input;
wherein the determination that at least one of the events is an outlier comprises counting n grams of events and inputting the counted n grams to the clustering algorithm.

* * * * *